(12) United States Patent
Mourou et al.

(10) Patent No.: US 8,770,968 B2
(45) Date of Patent: Jul. 8, 2014

(54) INJECTION MOLDING TOOL WITH EMBEDDED INDUCTION HEATER

(75) Inventors: Julien P. Mourou, Bloomfield Hills, MI (US); Urban J. De Souza, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 13/446,092

(22) Filed: Apr. 13, 2012

(65) Prior Publication Data
US 2013/0273264 A1 Oct. 17, 2013

(51) Int. Cl.
*B29C 45/73* (2006.01)
(52) U.S. Cl.
USPC .......................................... 425/547; 425/548
(58) Field of Classification Search
CPC ...... B29C 45/73; B29C 45/7312; B29C 45/27
USPC .................................. 425/547, 548
See application file for complete search history.

(56) References Cited

U.S. PATENT DOCUMENTS

| 7,981,350 | B2 * | 7/2011 | Jaderberg et al. | 425/548 |
| 8,425,961 | B2 * | 4/2013 | Turek | 426/282 |
| 2009/0220723 | A1 * | 9/2009 | Jaderberg et al. | 425/548 |
| 2009/0239023 | A1 * | 9/2009 | Olin et al. | 425/547 |
| 2010/0207289 | A1 * | 8/2010 | Feick et al. | 264/39 |

* cited by examiner

*Primary Examiner* — Tim Heitbrink
(74) *Attorney, Agent, or Firm* — Quinn Law Group, PLLC

(57) ABSTRACT

An injection molding tool includes a first mold die having a first tool face and a second mold die having a second tool face. The second mold die is configured to abut the first mold die, wherein the first tool face and second tool face are configured to partially define a part cavity between the first mold die and the second mold die. An induction heating element is embedded into the first mold die such that the induction heating element defines a portion of the first tool face. The induction heating element includes an electrical conductor, an electrically insulating material disposed about the conductor, and a ferromagnetic material disposed adjacent the electrical conductor and electrically insulating material.

16 Claims, 3 Drawing Sheets

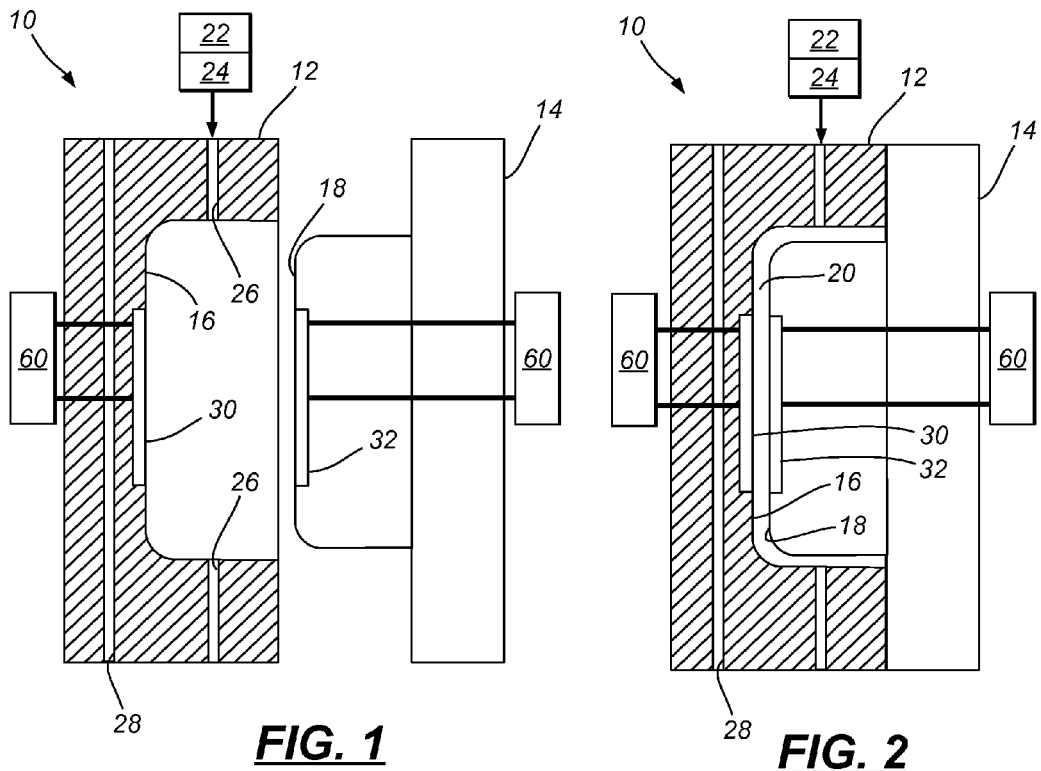
FIG. 1
FIG. 2
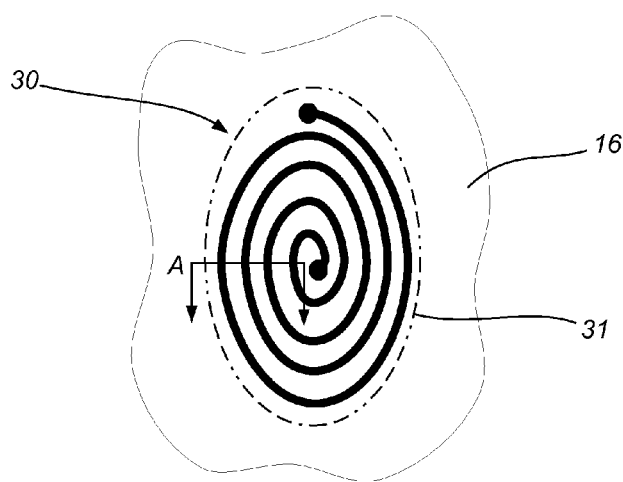
FIG. 3

INJECTION MOLDING TOOL WITH EMBEDDED INDUCTION HEATER

TECHNICAL FIELD

The present invention relates generally to injection molding tooling.

BACKGROUND

Many automotive components, such as fascias, body side moldings, side panels, etc., may be produced by an injection molding process followed by painting. In conventional part forming processes, a resin material may be injected into a part cavity formed by a plurality of mold dies.

Differences between the tool face temperature and the temperature of the resin may impact the quality of the part as well as the ability to keep the material near the glass transition temperature to achieve a class "A" finish and gloss on the part. These temperature differences may also induce internal stresses within the resin. If the resin does not harden properly, the molded part may require a separate finishing operation to correct any resulting cosmetic imperfections.

SUMMARY

An injection molding tool includes a first mold die having a first tool face and a second mold die having a second tool face. The second mold die is configured to abut the first mold die, wherein the first tool face and second tool face are configured to partially define a part cavity between the first mold die and the second mold die. An induction heating element is embedded into the first mold die such that the induction heating element defines a portion of the first tool face. The induction heating element may include an electrical conductor, an electrically insulating material disposed about the conductor, and a ferromagnetic material disposed adjacent the electrical conductor and electrically insulating material.

In one configuration, the ferromagnetic material of the induction heating element may define a portion of the first tool face. The induction heating element may further include a bridge plate disposed between the electrically insulating material and the ferromagnetic material. Each of the first mold die and the second mold die may comprise a non-ferromagnetic material, wherein the induction heating element is embedded into the non-ferromagnetic material of the first mold die. At least one of the first mold die and the second mold die may further define a resin inlet port in fluid communication with the part cavity.

The injection molding tool may further comprise an alternating current waveform generator in electrical communication with the electrical conductor. The alternating current waveform generator may be configured to transmit an alternating current electrical signal through the electrical conductor, wherein the alternating current electrical signal is configured to inductively heat the ferromagnetic material.

In one configuration, the induction heating element is a first induction heating element; and the tool may further comprise a second induction heating element embedded into the second mold die such that the second induction heating element defines a portion of the second tool face.

A method of embedding an induction heating element into a tool face of an injection molding die may include depositing an electrically conductive material on the injection molding die; depositing an electrically insulating material on the injection molding die between the electrically conductive material and the non-ferromagnetic substrate; depositing a ferromagnetic material on the injection molding die adjacent to the electrically conductive material and the electrically insulating material. In this manner, the ferromagnetic material may partially define the tool face of the injection molding die.

Additionally, the method may include machining a channel into the tool face of the injection molding die. Each of the electrically conductive material, electrically insulating material, and ferromagnetic material may be deposited within the machined channel, such as by using laser deposition techniques.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a partial schematic cross-sectional view of an injection molding tool with an induction heating element and displayed in an open configuration.

FIG. 2 is a partial schematic cross-sectional view of the injection molding tool of FIG. 1, displayed in a closed configuration.

FIG. 3 is a schematic plan view of an induction heating element disposed on a tool face.

DETAILED DESCRIPTION

Figure 4:
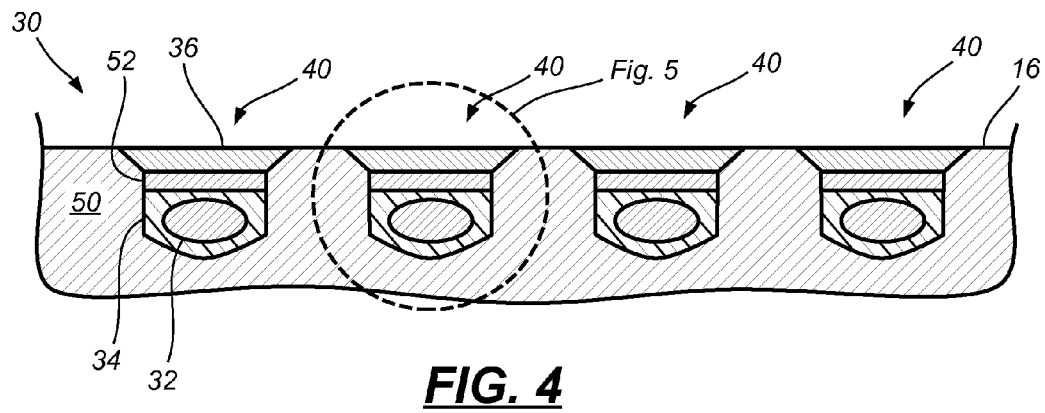
FIG. 4 is a schematic cross-sectional view of a portion of an induction heating element embedded into a tool face of an injection molding die, such as taken along line-A of FIG. 3.

Referring to the drawings, wherein like reference numerals are used to identify like or identical components in the various views, FIGS. 1 and 2 schematically illustrate an injection molding tool 10 having a first mold die 12 and a second mold die 14. As generally shown, the first mold die 12 may include a first tool face 16 and the second mold die 14 may include a second tool face 18. As illustrated in FIG. 2, the first and second mold dies 12, 14 may be coupled together such that the first and second tool faces 16, 18 at least partially define a part cavity 20 between the respective first and second mold dies 12, 14.

As may be appreciated, FIG. 1 schematically illustrates the injection molding tool 10 in an open configuration (i.e., where the first mold die 12 and second mold die 14 are respectively separated), and FIG. 2 schematically illustrates the injection molding tool 10 in a closed configuration (i.e., where the first mold die 12 and second mold die 14 abut each other). It should be readily apparent that FIGS. 1 and 2 are largely simplified and may omit other ancillary equipment that may be required to completely form a part through an injection molding process.

In operation, the first mold die 12 and second mold die 14 may be coupled together, as generally shown in FIG. 2. The coupling may be made under force, such as using, for example, a hydraulic press (not shown). A resin material may be heated to a pre-defined temperature by a heater 22, and may be injected into the part cavity 20 via one or more resin inlet ports 26 (for example, by using an injector 24) to begin part formation. After a time period (which depends upon the part size and material used to form the part), the tool 10 may be cooled by providing a cooling fluid (e.g., water) into one or more cooling ports 28. After cooling to a predetermined temperature, the first mold die 12 and second mold die 14 of the tool 10 may be separated or opened (see, FIG. 1) and the hardened part may be removed.

To prevent a portion of the heated liquid resin from cooling prematurely, as it enters the part cavity 20, one or more induction heating elements 30, 32 may be embedded into the respective first and/or second mold dies 12, 14 to maintain the respective first and/or second tool faces 16, 18 at a temperature near or above the glass transition temperature of the injected resin. In this manner, the tool 10 may not act as a heat sink to draw substantial amounts of heat from the resin, (i.e., the temperature gradient between the tool 10 and the resin will be small).

As illustrated, the induction heating elements 30, 32 may define a portion of the respective first and second tool faces 16, 18. In this manner, the tool face of the die may be locally heated without substantially heating the remainder of the die. As will be discussed in greater detail below, such local heating may be accomplished by constructing at least a portion of the tool face from a ferromagnetic material. An applied alternating electromagnetic flux may then directly heat the tool face separate from the remainder of the die. This differs substantially from a resistive heating element, which must be disposed below the hardened tool face, and would heat in all directions from the resistive element (i.e., the body of the die would absorb as much or more thermal energy as the tool face). In a similar application, the injection molding tool 10 (or a variant thereof), may be used in a compression molding process, such as with compression molding of composites.

FIGS. 3-7 schematically illustrate various embodiments of an induction heating element (generally at 30) that may be embedded into a first tool face 16. It should be appreciated that FIGS. 4-7 illustrate schematic cross-sectional views of a portion of a respective induction heating element 30, such as generally illustrated in FIG. 3, and generally viewed along section "A". The full heating element 30 may cover an area 31 of the tool face 16, and may be specifically arranged in a manner known in the art of induction heating (e.g., in a coiled arrangement as illustrated in FIG. 3, or in one or more straight line sections), and more specifically in a manner to accommodate the requirements of the tool shape, design, and/or size (for example, and without limitation, the heating element 30 may generally be disposed about sharp corners or thin flats to ensure proper fluidic resin flow into the full part cavity).

Referring to FIG. 4, the induction heating element 30 may include an electrical conductor 32, an electrically insulating material 34 disposed about the conductor 32, and a ferromagnetic material 36 disposed adjacent to the electrical conductor 32 and electrically insulating material 34. As may be appreciated, FIG. 4 illustrates a plurality of loops 40 of a coiled induction heating element 30. Each loop 40 may be similarly arranged, and may be coupled with each other loop 40 in space, such as generally illustrated in FIG. 3 (e.g., through a spiral arrangement).

As generally illustrated, the ferromagnetic material 36 of the induction heating element 30 may partially define the first tool face 16. In this manner, when a high frequency alternating current waveform is provided to the conductor 32, the ferromagnetic material 36 portion of the tool face 16 may experience an inductive heating effect, which may cause a corresponding temperature increase of the tool face 16. In an embodiment, the ferromagnetic material 36 may be, for example, tool steel. In an embodiment, the ferromagnetic material 36 may comprise steel grades such as P4 (5% Chromium), P5 (2.25% Chromium), or P20 (1.7% Chromium). In a more general sense, the ferromagnetic material 36 may be any material that exhibits a ferromagnetic effect. To ensure that induction heating effect is locally concentrated at the tool face 16, the remaining substrate 50 of the mold die 12 may comprise a non-ferromagnetic material (i.e., a material that is generally impervious to magnetism). Furthermore, a non-ferromagnetic bridge plate 52 may be disposed between the electrically insulating material 34 and the ferromagnetic material 36.

Referring again to FIGS. 1 and 2, the injection molding tool may further include an alternating current waveform generator 60 in electrical communication with the induction heating element, and configured to transmit an alternating current electrical signal through the electrical conductor 32. In one configuration, the electrical signal supplied by the alternating current waveform generator 60 may have a frequency of between 1 kHz and 10 kHz. Other frequencies, however, may be used depending on the specific application.

Figure 5:
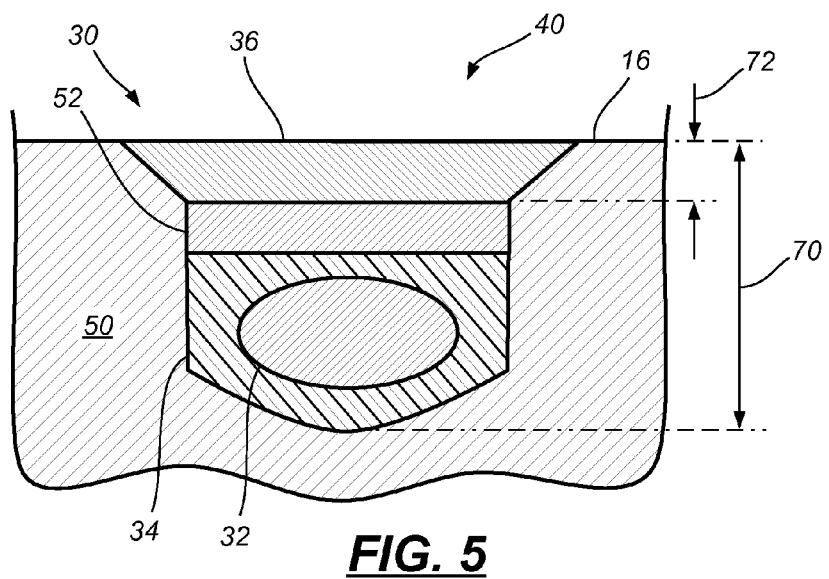
FIG. 5 is an enlarged schematic cross-sectional view the area designated "FIG. 5" in FIG. 4.

FIG. 5 is an enlarged schematic view of the area designated "FIG. 5" in FIG. 4. As illustrated, the induction heating element 30 may be embedded into the tool face 16 by a total depth 70. In one configuration, the total depth 70 may be approximately less than one inch (<25.4 mm), with the thickness 72 of the ferromagnetic material 36 being approximately between ⅛ inch and ¼ inch (approximately between 3 mm and 7 mm). It should be appreciated that other configurations/depths/thicknesses may be similarly used depending on the particular application.

Figure 6:
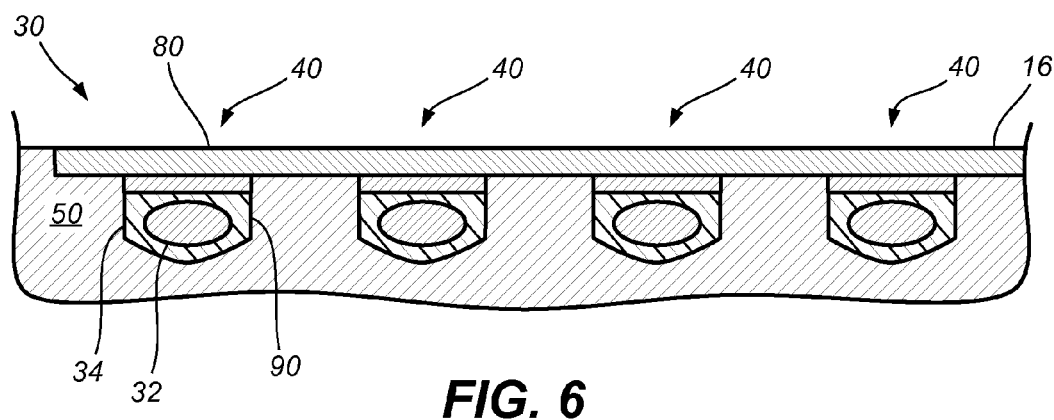
FIG. 6 is a schematic cross-sectional view of a portion of an induction heating element embedded into a tool face of an injection molding die, such as taken along line-A of FIG. 3.

Referring again to FIG. 4, in one configuration, the ferromagnetic material 36 may be locally disposed proximate to each loop 40 of the conductor 32. In this manner, there may be non-ferromagnetic substrate material 50 separating the plurality of loops of ferromagnetic material 36. In another configuration, such as generally illustrated in FIG. 6, a single plate 80 or lining of ferromagnetic material may be disposed above each of the plurality of loops 40 of the conductor 32 across the entire area 31. Furthermore, depending on the particular application and part/tool design, the ferromagnetic properties and/or material composition of the ferromagnetic plate 80 may be varied across the area of the plate to more precisely control the inductive heating profile (i.e., more ferromagnetic material may yield greater inductive heating effects).

To embed the induction heating element 30 into the tool face 16, in one configuration, a channel may first be machined into a tool face 16 of a mold die to a total depth 70. Each of the electrical conductor 32, the electrically insulating material 34, and the ferromagnetic material 36 may then be deposited within the machined channel in an arrangement as generally illustrated in FIGS. 4-6. The depositing may include, for example, laser deposition techniques, where a powder of the respective material may be fused to the substrate using laser energy. Other depositing techniques may include three-dimensional printing, closed-loop direct metal deposition, electron beam sputtering, selective laser sintering, fused deposition modeling, or any other additive manufacturing process known in the art.

Figure 7:
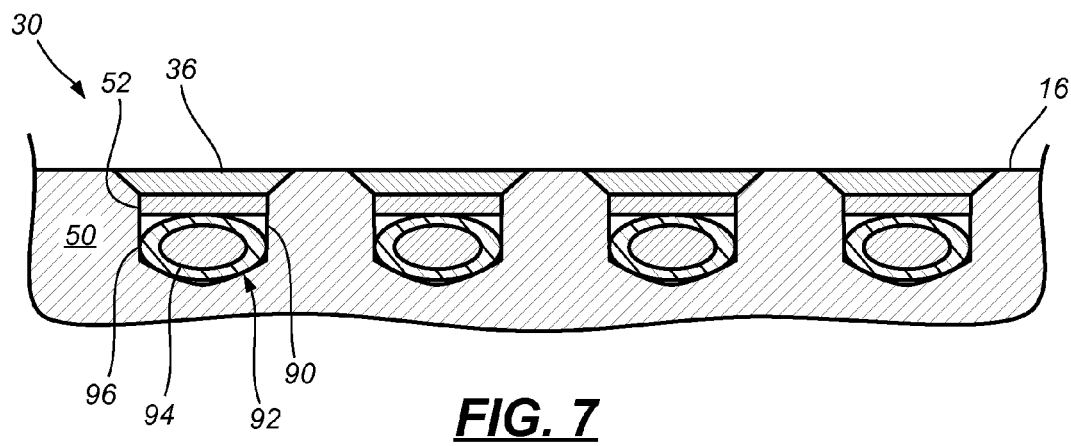
FIG. 7 is a schematic cross-sectional view of a portion of an induction heating element embedded into a tool face of an injection molding die, such as taken along line-A of FIG. 3.

In another configuration, as generally illustrated in FIG. 7, a channel 90 may initially be machined into the substrate 50. Following the machining, an insulated wire 92, comprising an electrical conductor 94, and an electrically insulating material 96 disposed about the conductor 94, may be inlaid into the channel 90. The bridge plate 52 may then be inlaid into the channel 90, adjacent the wire 92. The bridge plate 52 may be stitch welded to the substrate 50 to ensure that it is securely held in place. Following the installation of the bridge plate 52, the ferromagnetic material 36 may be deposited onto the bridge plate 52, such as using laser deposition techniques. A suitable finishing process may then be used to ensure that the tool face 16 has a suitable surface finish.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An injection molding tool comprising:
   a first mold die having a first tool face;
   a second mold die having a second tool face and configured to abut the first mold die, the first tool face and second tool face configured to partially define a part cavity between the first mold die and the second mold die; and
   an induction heating element embedded into the first mold die such that the induction heating element defines a portion of the first tool face, the induction heating element including:
      an electrical conductor;
      an electrically insulating material disposed about the conductor; and
      a ferromagnetic material disposed adjacent the electrical conductor and the electrically insulating material.

2. The injection molding tool of claim 1, wherein the ferromagnetic material of the induction heating element defines a portion of the first tool face.

3. The injection molding tool of claim 1, wherein the induction heating element further includes a bridge plate disposed between the electrically insulating material and the ferromagnetic material.

4. The injection molding tool of claim 1, wherein each of the first mold die and the second mold die comprise a non-ferromagnetic material, the induction heating element being embedded into the non-ferromagnetic material of the first mold die.

5. The injection molding tool of claim 1, wherein the temperature of the ferromagnetic material is configured to increase through inductive heating when an alternating current waveform is provided to the electrical conductor.

6. The injection molding tool of claim 1, further comprising an alternating current waveform generator in electrical communication with the electrical conductor and configured to transmit an alternating current electrical signal through the electrical conductor, and wherein the alternating current electrical signal is configured to inductively heat the ferromagnetic material.

7. The injection molding tool of claim 1, wherein at least one of the first mold die and the second mold die define a resin inlet port in fluid communication with the part cavity.

8. The injection molding tool of claim 7, further comprising an injector in fluid communication with the resin inlet port.

9. The injection molding tool of claim 1, wherein the induction heating element is a first induction heating element; and
   further comprising a second induction heating element embedded into the second mold die such that the second induction heating element defines a portion of the second tool face.

10. The injection molding tool of claim 1, wherein the electrical conductor and the electrically insulating material disposed about the conductor comprise a wire.

11. An injection molding tool comprising:
    a first mold die having a first tool face;
    a second mold die having a second tool face and configured to abut the first mold die, the first tool face and second tool face configured to partially define a part cavity between the first mold die and the second mold die; and
    an induction heating element embedded into the first mold die such that the induction heating element defines a portion of the first tool face, the induction heating element including:
       an electrical conductor;
       an electrically insulating material disposed about the conductor;
       a ferromagnetic material disposed adjacent the electrical conductor and the electrically insulating material, and defining a portion of the first tool face; and
    wherein each of the first mold die and the second mold die are formed from a non-ferromagnetic material, the induction heating element being embedded into the non-ferromagnetic material of the first mold die.

12. The injection molding tool of claim 11, wherein the induction heating element further includes a bridge plate disposed between the electrically insulating material and the ferromagnetic material.

13. The injection molding tool of claim 11, wherein the temperature of the ferromagnetic material is configured to increase through inductive heating when an alternating current waveform is provided to the electrical conductor.

14. The injection molding tool of claim 11, further comprising an alternating current waveform generator in electrical communication with the electrical conductor and configured to transmit an alternating current electrical signal through the electrical conductor, and wherein the alternating current electrical signal is configured to inductively heat the ferromagnetic material.

15. The injection molding tool of claim 11, wherein at least one of the first mold die and the second mold die define a resin inlet port in fluid communication with the part cavity.

16. The injection molding tool of claim 11, wherein the induction heating element is a first induction heating element; and
    further comprising a second induction heating element embedded into the second mold die such that the second induction heating element defines a portion of the second tool face.

* * * * *